United States Patent [19]
Maggio

[11] Patent Number: 5,328,223
[45] Date of Patent: Jul. 12, 1994

[54] END GRAPPLE FOR NURSERIES

[76] Inventor: Lewis R. Maggio, R.R. 2, Box 56, Morocco, Ind. 47963

[21] Appl. No.: 3,280

[22] Filed: Jan. 12, 1993

[51] Int. Cl.⁵ ............................................. B66C 1/42
[52] U.S. Cl. ............................... 294/86.41; 294/104; 294/88; 414/732
[58] Field of Search ...................... 294/86.4, 86.41, 88, 294/104; 414/729, 732, 738, 740; 901/37, 39

[56] References Cited

U.S. PATENT DOCUMENTS

| | | | |
|---|---|---|---|
| 3,164,405 | 1/1965 | Lull | 294/104 X |
| 3,902,614 | 9/1975 | Roberts et al. | 294/86.41 X |
| 4,005,895 | 2/1977 | Cullings | 294/86.41 X |
| 4,017,114 | 4/1977 | LaBounty | 414/740 X |
| 4,451,194 | 5/1984 | Keats et al. | 294/86.41 X |
| 4,542,929 | 9/1985 | Possinger | 294/88 |
| 4,645,410 | 2/1987 | Royer | 294/104 X |
| 5,073,080 | 12/1991 | Blum | 294/86.41 X |
| 5,219,265 | 6/1993 | Recker | 294/86.41 X |

Primary Examiner—Dean J. Kramer
Attorney, Agent, or Firm—Hill, Steadman & Simpson

[57] ABSTRACT

An end grapple for use on loader tractors in nurseries to load and unload trees and shrubs onto and off of trucks and the like includes a grapple head with three fingers. Two of the fingers are fixed to the head and extend generally straight, while the third finger is curved and is mounted for pivotable movement to grip the earth balls of the trees and shrubs. The pivotable finger is movable by a hydraulic cylinder. The grapple head is mounted on the end of a rotation shaft that is driven for rotation by a hydraulic drive motor to permit trees in any orientation to be grasped by the grapple. A quick release connection permits easy and fast changing of the grapple head with other equipment.

10 Claims, 3 Drawing Sheets

END GRAPPLE FOR NURSERIES

BACKGROUND OF THE INVENTION

1. Field of the Invention

The present invention relates generally to an end effector for a loader tractor, and more particularly to a rotatable grapple having three gripping fingers.

2. Description of the Related Art

In nurseries, trees and shrubs bound up with an earthen ball wrapped in cloth about its roots are moved about after being dug up, are loaded onto trucks for shipping and are unloaded from trucks when received from other nurseries. The trees and shrubs are found lying in many different orientations on the ground and in the trucks. It is common practice to manually lift the tree or shrub into an upright position, typically using two, three, or more workers depending on the size of the tree, and then insert the forks of a fork lift beneath the tree ball for lifting and loading operations. The tree must be manually held in position while being lifted and loaded to avoid tipping over. Once in position in the truck, the tree must be positioned in a stable orientation and for least damage to the tree, thereby requiring additional workers on the truck.

This procedure is time consuming and requires many workers, thus resulting in high costs. On windy days, loading of trees can become impossible, particularly for larger trees.

SUMMARY OF THE INVENTION

An object of the present invention is to engage trees and shrubs bound with earthen balls that are lying in any orientation for lifting and moving of the trees and shrubs.

Another object of the invention is to lift and move trees and shrubs bound with earthen balls while requiring only a single worker.

A further object of the present invention is to orient trees and shrubs bound with earthen balls as desired while loading and to release the earthen ball in the desired position without shifting.

These and other objects and advantages of the invention are provided by an end grapple for a loader tractor having a rotation drive housing mountable on a loader tractor, the drive housing having a rotation drive driving a rotation shaft, a grapple head mounted on the end of the rotation shaft, the grapple head including two grip fingers or jaws fixedly mounted on a base and a third grip finger or jaw pivotable alternately toward and away from the first and second fingers.

The fixed fingers preferably have straight inner and outer edges to easy engagement and release of the earthen ball. The pivotable grip finger is then curved for secure engagement of the earthen ball. Either a tension spring and a hydraulic cylinder or a double acting cylinder alone are used to pivot the pivotable grip finger between an open position and a closed, gripping position.

Advantages are provided by a quick release connection between the rotation shaft and the grapple head. Other equipment may thereby be affixed to the rotation shaft when the grapple head is removed.

Preferably, the grip span of the fingers is adjustable, such as by alternate connection locations for the hydraulic cylinder that closes the pivotable grip finger.

The present grapple provides three point gripping of the earthen ball for secure engagement. Since the grapple is rotatable by, preferably, 360 degrees, the grapple may be turned to any orientation to grasp the earthen ball. Once lifted, the earthen ball and the tree or shrub may be turned to any orientation for loading and/or transportation.

DETAILED DESCRIPTION OF THE PREFERRED EMBODIMENTS

Figure 1:
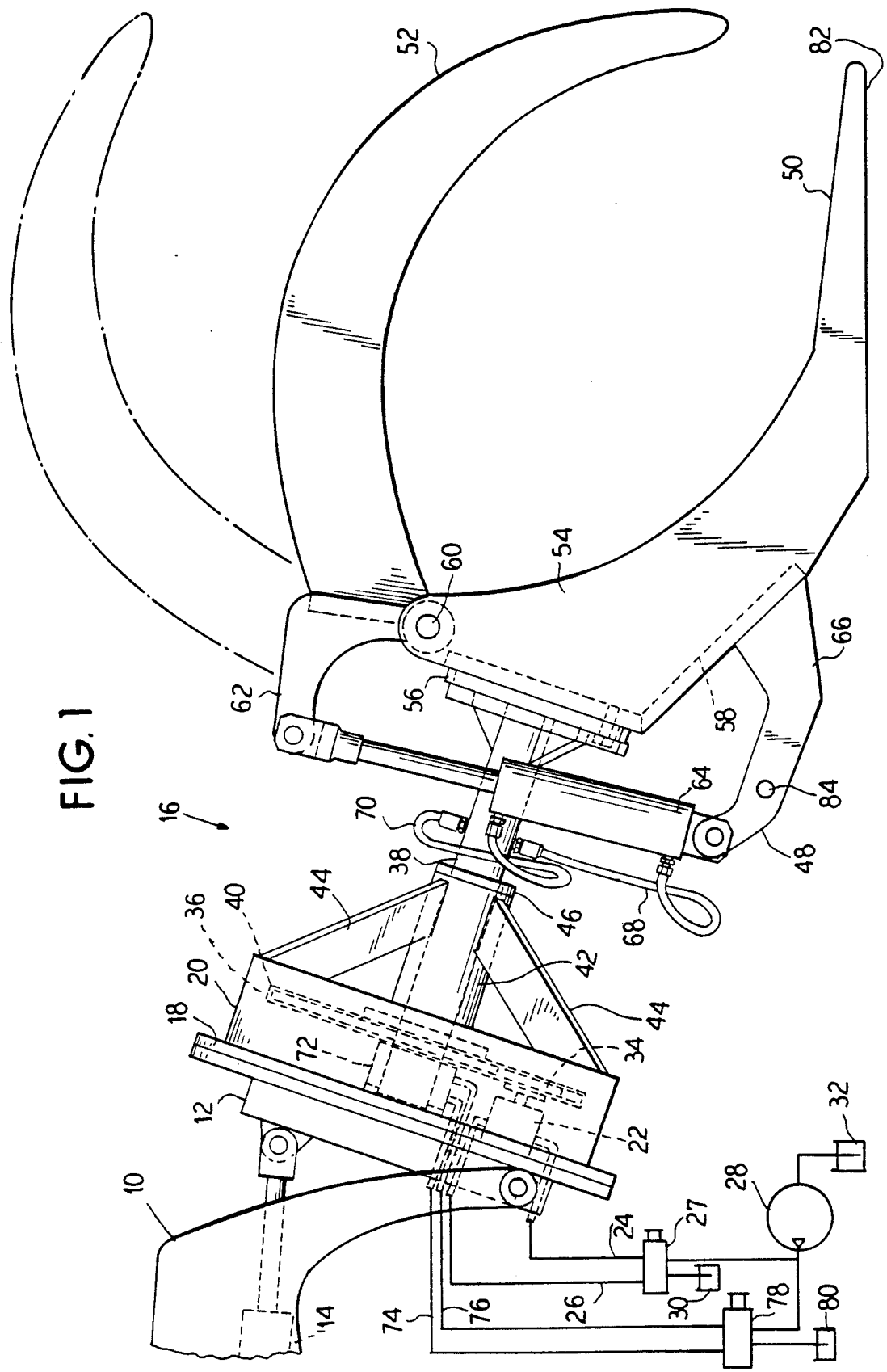
FIG. 1 shows a portion of a loader tractor having a hydraulic drive system and having a end effector grapple according to the principles of the present invention attached thereto.

In FIG. 1 is shown a loader arm 10 and mount 12 of a loader tractor (not shown in greater detail) that is movable in a vertical arc under the control of an operator, as is known. On the end of the loader arm 10 is the mount 12 that is pivotable relative to the end of the loader arm 10. The mount 12 is held in position and is moved relative to the loader arm 10 by a hydraulic cylinder 14. The present invention may be adapted for use on a loader arm of any of a variety of loader tractors, for example, on a Bobcat loader tractor.

An end grapple 16 according to the present invention is mounted on the mount 12 via a flat mounting plate 18 on a rear surface of a rotation drive housing 20. The shape of the mounting plate 18 depends on the loader tractor to which the present device is to be mounted.

The rotation drive housing 20 contains a hydraulic motor 22 connected to hydraulic lines 24 and 26. The operation of the hydraulic motor 22 is controlled by a valve 27 and a hydraulic pump 28 with corresponding reservoirs 30 and 32. Since the motor 22 is to rotate in either direction, the valve 27 must control flow in both directions. The drive shaft of the motor 22 has a sprocket 34 mounted thereon. A much larger sprocket 36 is mounted on a rotation shaft 38 which is mounted for rotation in the housing 20. A drive chain 40 extends about the two sprockets 34 and 36 so that the motor 22 operates to rotate the rotation shaft 38.

The hydraulic motor 22 may be outside the housing 20 with its drive shaft extending through the housing wall so that the sprocket 34 is within the housing 20. The hydraulic lines 74 and 76 may be fed into the housing 20 from either the front or the back wall.

The rotation shaft 38 extends outward from the housing 20 and is supported by a sleeve 42 and braces 44 that extend between the sleeve 42 and the housing 20. Grease fittings are provided on the sleeve 42. A retaining ring 46 is fixed to the shaft 38 at an end of the sleeve 42.

Mounted on the free end of the rotation shaft 38 is a grapple head 48 with two stationary grip fingers 50 (the second grip finger being shown behind the first grip finger in FIG. 1) and a pivotable grip finger 52. The stationary grip fingers 50 extend endwardly from grip plate portions 54 which are connected on either side of a base 56 affixed to the end of the rotation shaft 38. Additional support is provided by a reinforcing plate 58 that is mounted between the grip plate portions 54 at an angle to the base 56. The pivotable grip finger, or jaw, 52 is mounted on a pivot shaft 60 that extends between the grip plate portions 54.

A cylinder bracket 62 is connected to the pivotable grip finger 52 and is also connected to one end of a hydraulic cylinder 64. The other end of the hydraulic cylinder 64 is connected to a fixed cylinder bracket 66 that extends to the reinforcing plate 58 lying between the grip plate portions 54. The hydraulic cylinder 64 is, in the illustrated embodiment, a double acting cylinder and so pivots the pivotable grip finger 52 alternately toward and away from the stationary grip fingers 50. The hydraulic drive for the cylinder 64 is through hydraulic lines 68 and 70 that connect to bores in the rotation shaft 38. The hydraulic fluid is fed into the shaft 38 at a seal sleeve 72 within the rotation housing 20. Lines 74 and 76 lead from the seal sleeve 72 through a valve 78 to a reservoir 80 and to the pump 28. The seal sleeve 72 is prevented from rotating by a stop bracket (not shown) connected to the interior of the drive housing 20, or by the stiffness of the hydraulic lines 74 and 76.

Although a double acting cylinder 64 is shown, a single acting cylinder may be used instead to close the pivotable grip finger 52. The pivotable finger 52 is then opened by some other means, such as a tension spring (not shown) connected between the brackets 62 and 66.

By selective operation of the pump 28 and the valve 27, the rotation shaft 38 and thus the grapple head 48 are rotated by as much as 360 degrees or more. The grapple head 48 is thereby oriented to the angle of the earthen ball to be gripped. The tilting of the grapple head 48 is controlled by the cylinder 14 on the loader tractor. The grapple head 48 may be tilted to place flat outside surfaces 82 of the stationary grip fingers 50 parallel to the ground or to the truck bed or the like so that the grip fingers 50 may be slid beneath the earthen ball without disturbing it. The hydraulic cylinder 64 is then operated under control of the pump 28 and the valve 78 to move the pivotable grip finger 52 against the earthen ball and thereby securely grip it. The inner surfaces of the stationary grip fingers 50 are also straight to release the earthen ball.

An adjustment hole 84 is provided in the fixed cylinder bracket 66 in which the end of the hydraulic cylinder 64 may be fixed. By relocating the connection of the cylinder from the position shown in FIG. 1 to the adjustment hole 84, the extent to which the pivotable grip finger 52 may be opened is increased.

Figure 2:
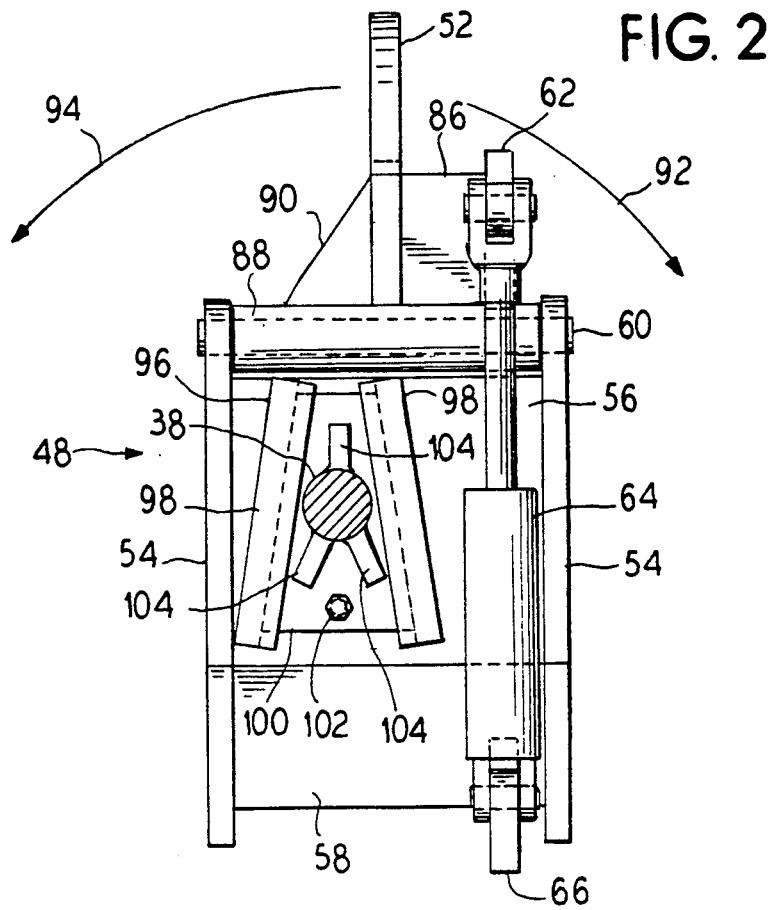
FIG. 2 is a cross section showing the back of the grapple head.

In FIG. 2, the grapple head 48 is shown from the back with the rotation shaft 38 just to one side of center and the hydraulic cylinder 64 to the other side of center. The movement of the hydraulic cylinder 64 is transmitted to the pivotable grip finger 52 by the cylinder bracket 62 which is welded to a plate 86 that is in turn welded to the pivotable grip finger 52. The bracket 62 and the plate 86 as well as the pivotable grip finger 52 are welded to a bearing sleeve 88 that is provided about the pivot shaft 60. On the side of the pivotable grip finger 52 opposite the plate 86 is provided a gusset 90 for reinforcement.

The grapple head 48 rotates about an axis extending through the rotation shaft 38 in either direction, as indicated by arrows 92 and 94. The grapple head 48 may be rotated by more than 360 degrees.

The rotation shaft 38 is mounted on the base 56 of the grapple head by a quick release connection 96. The quick release connection includes a pair of rails 98 mounted at an angle to one another on the base 56 and a wedge shaped plate 100 slidably received in the rails 98. The wedge shaped plate 100 is held in place by a bolt 102 that extends through an opening in the wedge shaped plate 100 and through an opening in the base 56 in registration therewith. By removal of the bolt 102, the wedge shaped plate 100 may be slid downward relative to FIG. 2 and the grapple head 48 removed from the end of the rotation shaft 38. Reinforcing gussets 104 supporting wedge shaped plate 100 on the end of the rotation shaft 38 are also seen in FIG. 2.

The quick release connection 96 may be used to mount other devices to the end of the rotation shaft 38. For example, a hole digger (not shown) may be mounted on the quick release connection 96 when the grapple head 48 is removed.

Figure 3:
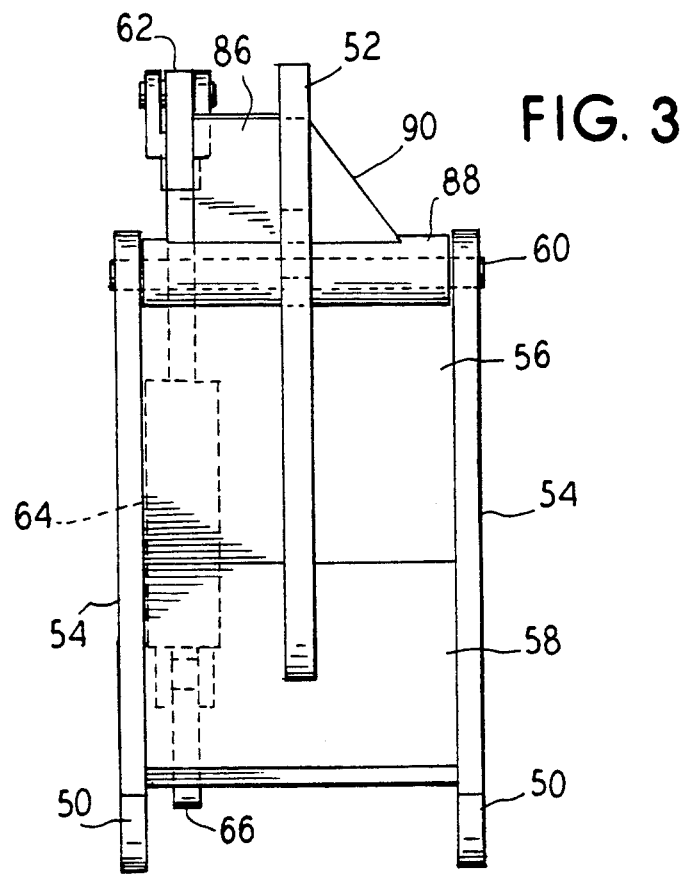
FIG. 3 is an end elevational view of the end effector grapple of the present invention.

Referring now to FIG. 3, the relative position of the pivotable grip finger 52 and the stationary grip fingers 50 may be seen in this front view. The fingers 50 and 52 provide three point support for earthen balls being held therein.

Figure 4:
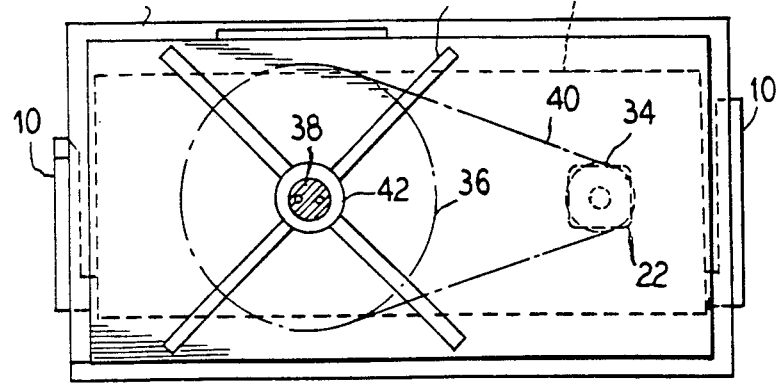
FIG. 4 is a cross section showing the front of the motor housing with the rotation drive shown in phantom.

The rotation drive housing 20 is shown in FIG. 4, wherein the relative positions of the hydraulic motor 22 and the rotation shaft 38 are seen. The drive chain 40 extends between the small sprocket 34 on the hydraulic motor 22 and the large sprocket 36 on the rotation shaft 38. The loader arm 10 is visible behind the drive housing 20.

Figure 5:
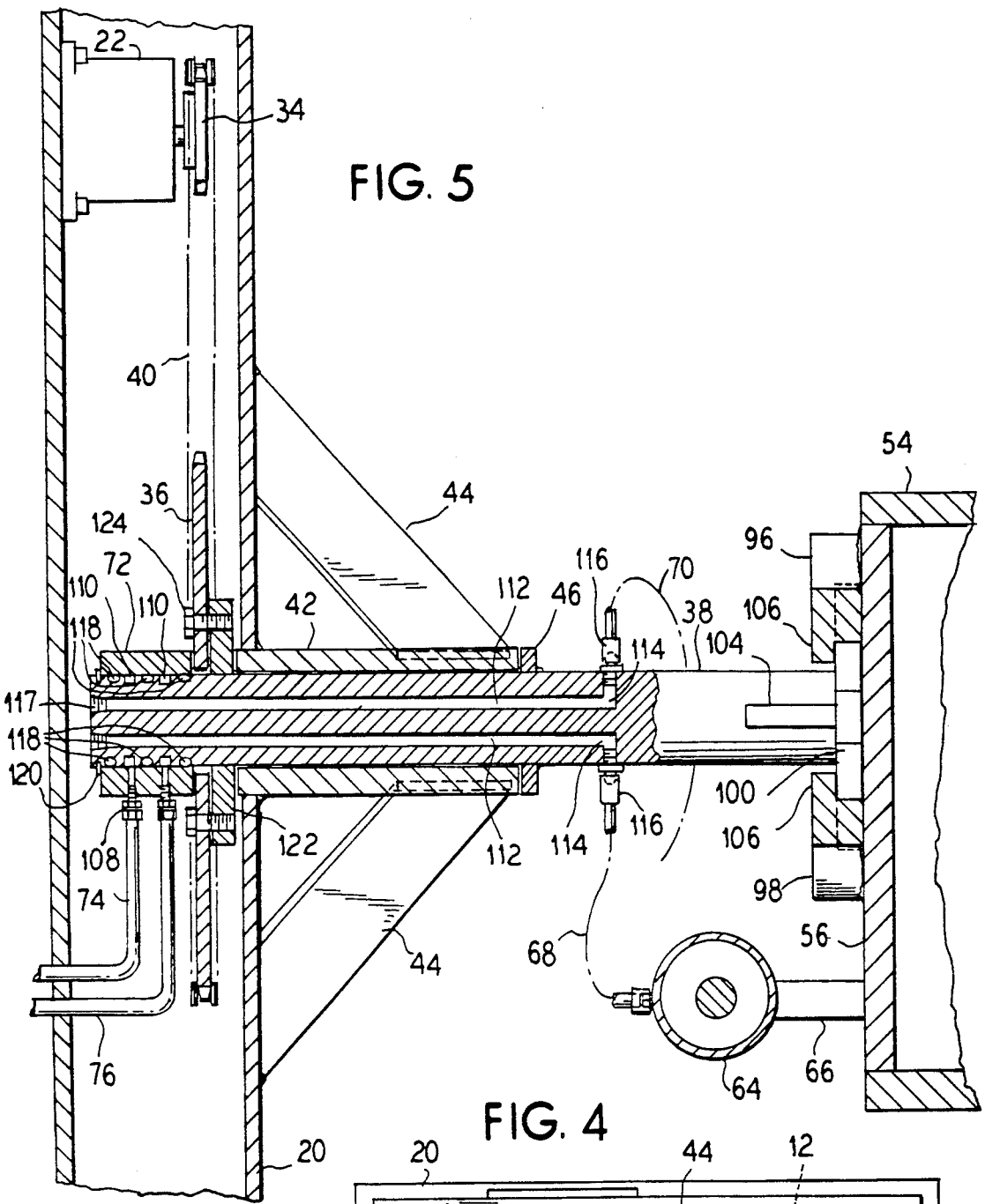
FIG. 5 is a partial cross section along the rotation shaft showing connections for the hydraulic system.

In the enlarged detail view of FIG. 5, the wedge shape plate 100 is fitted under an overhang 106 on each of the rails 96 and 98 and is thereby held against the base 56.

Also in FIG. 5, the hydraulic connections between the lines 74 and 76 and the cylinder 64 are shown in greater detail. The lines 74 and 76 are connected to fittings 108 in the seal sleeve 72, the fittings being in fluid communication with channels 110 about the rotation shaft 38. The channels 110 connect to respective longitudinal bores 112 that extend internally of the rotation shaft 38. The longitudinal bores 112 extend to transverse bores 114 that connect to fittings 116 in the rotation shaft 38 to which the lines 68 and 70 are connected. The fittings 108 and 116 are threaded into the seal sleeve 72 and the rotation shaft 38, respectively. The longitudinal bores 112 have one end closed by plugs 117. O-ring seals 118 are provided between the seal sleeve 72 and the rotation shaft 38 to prevent leakage of the hydraulic fluid from the hydraulic system and from between the two lines. The O-ring seals 118 may be fitted into grooves formed in either the rotation shaft 38 or the seal sleeve 72. A snap ring 120 holds the seal sleeve 72 on the rotation shaft 38.

The large sprocket 36 is held on the rotation shaft 38 by being bolted to a sprocket mounting ring, or drive hub, 122 via bolts 124. The drive hub 122 of the preferred embodiment is welded to the rotation shaft 38.

Although other modifications and changes may be suggested by those skilled in the art, it is the intention of the inventor to embody within the patent warranted hereon all changes and modifications as reasonably and properly come within the scope of his contribution to the art.

I claim:

1. An end grapple for a loader tractor having a hydraulic drive, comprising:

a rotation drive housing having means for supporting attachment to a loader of the loader tractor;

a rotation shaft extending from said rotation drive housing, said rotation shaft having a longitudinal bore connected to the hydraulic drive for carrying hydraulic fluid;

means for rotating said rotation shaft, including:
- a hydraulic motor connected to the hydraulic drive,
- a first sprocket mounted on a drive shaft of said hydraulic motor,
- a second sprocket mounted on said rotation shaft, and
- a drive chain connected said first and second sprockets;

a grapple head mounted to an end of said rotation shaft, said grapple head including:
- a base plate mounted transversely on said end of said rotation shaft;
- first and second grip plates mounted on opposite sides of said base plate and perpendicular thereto, said first and second grip plates each having a finger extending outwardly from one end of said base plate;
- a pivot shaft mounted extending between said grip plates at another end of said base plate and parallel to said base plate;
- a pivotable grip finger mounted for pivoting movement on said pivot shaft toward a position between said fingers of said first and second grip plates;
- a bracket mounted extending from said pivotable grip finger;
- a hydraulic cylinder connected between said bracket and said base plate, said hydraulic cylinder having a connection to said longitudinal bore in said rotation shaft to receive hydraulic fluid pressure and thereby pivot and pivotable grip finger toward said fingers of said first and second grip plates; and means for pivoting said pivotable grip finger away from said fingers of said first and second grip plates.

2. An end grapple as claimed in claim 1, wherein said fingers on said first and second grip plates have substantially straight inner and outer edges.

3. An end grapple as claimed in claim 1, wherein said pivotable grip finger is curved.

4. An end grapple as claimed in claim 1, wherein said hydraulic cylinder is a double acting cylinder and thereby comprises said means for pivoting said pivotable grip finger away from said fingers of said first and second grip plates.

5. An end grapple as claimed in claim 1, wherein said base plate comprises first and second plate sections at an angular relation to one another, said first plate section being connected to said rotation shaft substantially perpendicular to a rotational axis of said rotation shaft, and said second plate section mounted extending between said first and second grip plates.

6. An end grapple as claimed in claim 1, further comprising:
a quick release connection between said end of said rotation shaft and said base plate, said quick release connection including:
- a wedge shaped plate,
- means defining a wedge shaped opening for receiving said wedge shaped plate, and
- means for fastening said wedge shaped plate in said wedge shaped opening.

7. An end grapple as claimed in claim 6, wherein said means for fastening comprises a single bolt extending through an opening in said wedge shaped plate and through said base plate.

8. An end grapple as claimed in claim 1, further comprising:
means for adjusting a distance that said pivotable grip finger moves from said fingers of said first and second grip plates.

9. An end grapple as claimed in claim 8, wherein said means for adjusting comprises at least two connection openings to which said hydraulic cylinder is alternately connectable.

10. A gripper for mounting on a loader of a loader tractor, comprising:
a rotation drive unit mountable on the loader of the loader tractor, said rotation drive including:
- a shaft extending from the rotation drive, and
- means for rotating said shaft;

a grapple mounted of an end of said shaft, said grapple including:
- a base plate;
- first and second gripper fingers mounted on said base plate extending generally parallel to said shaft;
- a third gripper finger pivotally mounted on said base plate relative to said first and second gripper fingers;
- a hydraulic cylinder mounted to move said third gripper finger relative to said first and second gripper fingers;
- a quick release connection between said end of said shaft and said base plate, said quick release connection including:
  - a wedge shaped plate,
  - means defining a wedge shaped opening for receiving said wedge shaped plate, and
  - means for fastening said wedge shaped plate in said wedge shaped opening.

* * * * *